March 10, 1959

E. M. PIERCE 2,876,675

MIRROR FRAME FOR TWO VERTICALLY AND
HORIZONTALLY ADJUSTABLE MIRRORS

Filed July 20, 1956

E. M. Pierce

INVENTOR

BY *C. A. Snow & Co.*

ATTORNEYS.

March 10, 1959
E. M. PIERCE
2,876,675
MIRROR FRAME FOR TWO VERTICALLY AND
HORIZONTALLY ADJUSTABLE MIRRORS
Filed July 20, 1956
2 Sheets-Sheet 2
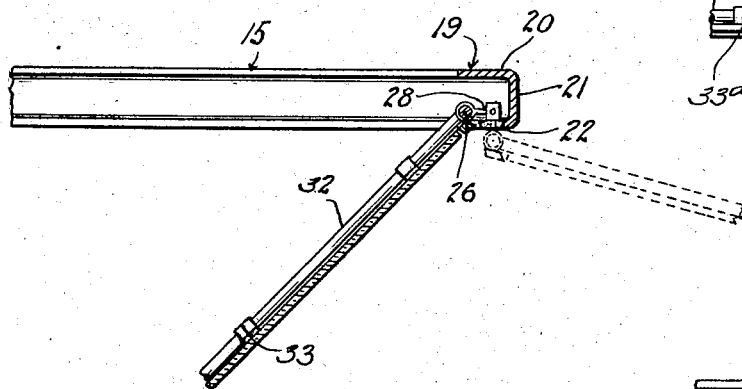
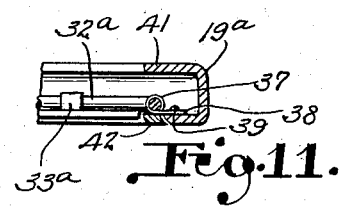
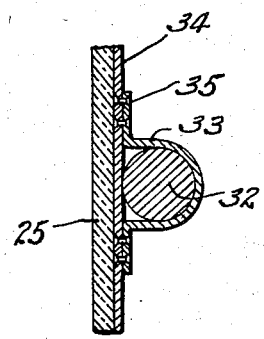
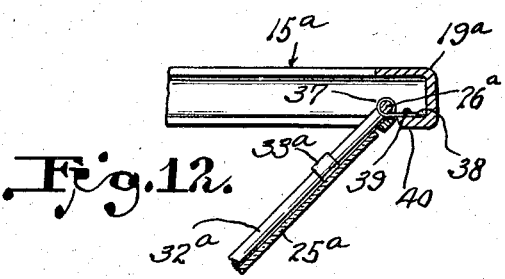
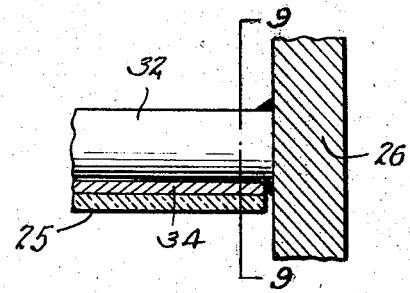
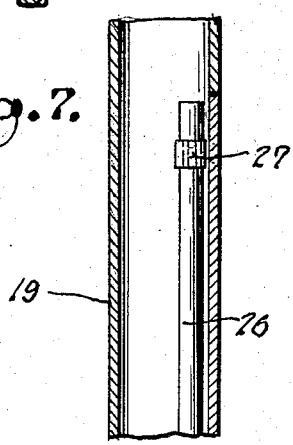
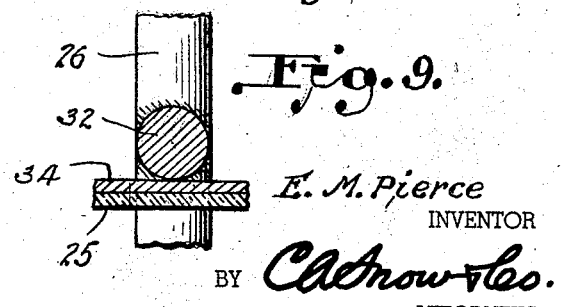
E. M. Pierce
INVENTOR
BY *Chenow Leo*
ATTORNEYS.

United States Patent Office 2,876,675
Patented Mar. 10, 1959

2,876,675

MIRROR FRAME FOR TWO VERTICALLY AND HORIZONTALLY ADJUSTABLE MIRRORS

Eldridge M. Pierce, North Highlands, Calif.

Application July 20, 1956, Serial No. 599,112

1 Claim. (Cl. 88—84)

This invention relates to an adjustable mirror.

An object of this invention is to provide an adjustable mirror by means of which a television set may be viewed from an angle to the set or in a room other than the room in which the set is located.

The adjustable mirror herein disclosed may be used for viewing hallways, rooms or other areas from a remote point, or from an undisclosed position.

A further object of this invention is to provide an adjustable mirror which may be adjusted about right angularly related axes so that a substantially universal adjustment by the mirror may be obtained.

With the foregoing and other objects in view which may appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Fig. 6 is a fragmentary horizontal section showing the mirror in operative position.

Fig. 7 is a fragmentary sectional view taken on line 7—7 of Fig. 3.

Fig. 8 is a fragmentary vertical section through the swingable mounting means for the mirror.

Fig. 9 is a fragmentary sectional view taken on line 9—9 of Fig. 8.

Fig. 10 is a fragmentary sectional view taken on line 10—10 of Fig. 2.

Fig. 11 is a fragmentary horizontal section showing a modified form of mounting means for the mirror.

Fig. 12 is a fragmentary sectional view similar to Fig. 11, showing the mirror in extended or angular position.

Figure 1:
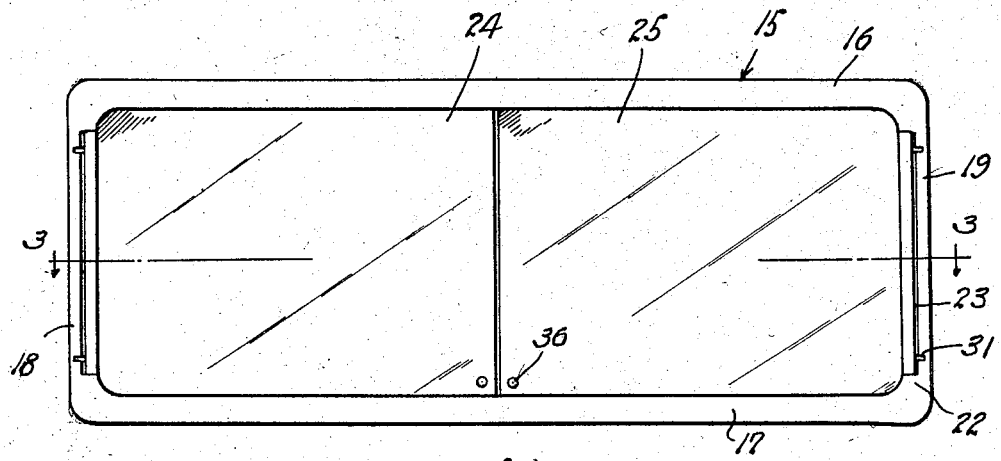
Figure 1 is a detail front elevation of an adjustable mirror constructed according to an embodiment of this invention.

Referring to the drawing, and first to Figs. 1 to 10 inclusive, the numeral 15 designates generally a rectangular frame structure which includes upper and lower frame bars 16 and 17 of substantially U-shape in transverse section and opposite end bars 18 and 19 which are also of substantially U-shape in transverse section. The end members 18 and 19 of the frame 15 are of like construction and each includes a rear wall 20, a right angular wall or bight 21 and a forward wall 22. The forward wall 22 is formed with a vertically disposed cut-out 23, the purpose for which will be hereinafter described. A pair of mirrors 24 and 25 are disposed within the frame 15 being of a size to loosely engage within the frame 15 so that the mirrors 24 and 25 may be extended or swung outwardly to an angular position with respect to the frame 15 or may be swung inwardly to be disposed in alignment one with the other and to be nested within the frame 15.

Figure 2:
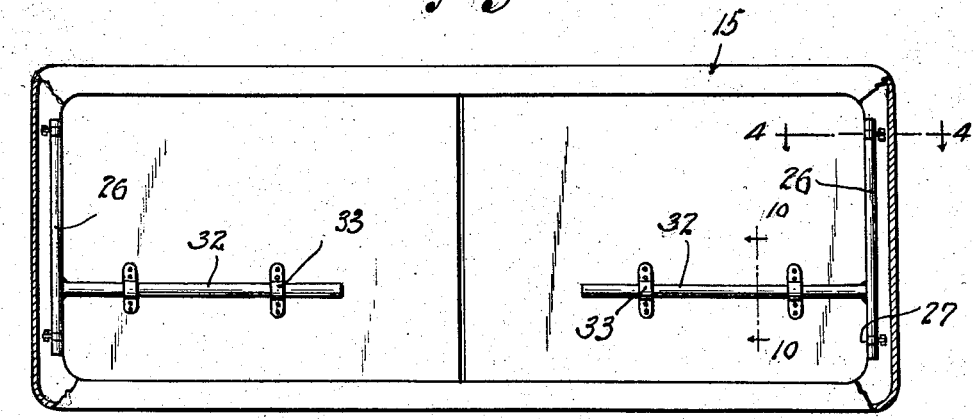
Fig. 2 is a rear elevation partly broken away and in section of the mirror structure.
Figure 3:
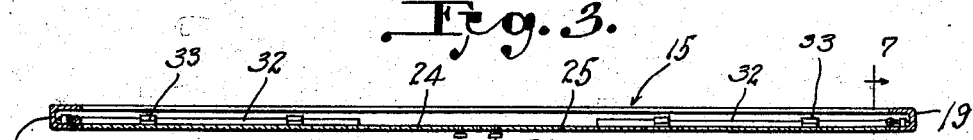
Fig. 3 is a sectional view taken on line 3—3 of Fig. 1.
Figures 4, 5:
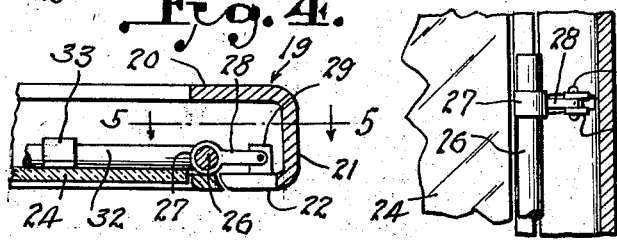
Fig. 4 is a fragmentary sectional view taken on line 4—4 of Fig. 2.
Fig. 5 is a fragmentary sectional view taken on line 5—5 of Fig. 4.

In order to provide a means whereby the mirrors 24 and 25 may be swung outwardly with respect to the frame 15, I have provided a vertically disposed hinge bar 26 which is pivotally supported relative to the end members 18 and 19 by means of upper and lower eyes 27 which have shanks 28 extending therefrom. The shanks 28 as shown in detail in Fig. 5, engage between a pair of ears 29 secured to the inner side of the wall 22 and a pivot member 30 engages through the ears 29 and the shank 28. The swingable mounting elements comprising parts 27 and 28 with the pivot member 30 provide a means for horizontal swinging of a mirror. Each end member 18 and 19 is provided with spaced pairs of slots 31 in which the shanks 28 are adapted to loosely engage when the mirror is swung outwardly with respect to the frame 15. Each mirror 24 and 25 is mounted for adjustment about a horizontal axis by means of a horizontal bar 32 which is fixed to and extends from the hinged vertical bar 26. The horizontal bar 32 is disposed below the horizontal axis of a mirror which is shown in Fig. 2 and the mirror is swingably secured to the horizontal bar 32 by means of a pair of clamps 33 which are fixed to a backing plate 34 by fastening means 35. Each mirror has a knob or button 36 secured to the lower inner portion thereof so that the mirror can be pulled outwardly with respect to the frame 15.

Referring now to Figs. 11 and 12 there is disclosed a modified form of this invention embodying a channel-shaped frame 15ª which is similar to frame 15. A vertical shaft or hinge bar 26ª is pivotally secured within the end members 19ª of the frame 15ª by means of hinge barrels 37. The hinge barrels 37 have a leaf 28 extending therefrom which is secured by fastening means 39 to the front wall 40 of the end member 19ª. The mirror 25ª is mounted for horizontal swinging by means of a horizontal bar 32ª which is welded or otherwise fixed to the vertical bar 26ª and the back of the mirror 25ª is pivotally secured to the bar 32ª by means of clips 33ª. In the present instance the front wall 40 of the end member 19ª is substantially shorter than the rear wall 41 and a bar 42 is fixed relative to the hinge structure embodying the shaft 26ª and the bar or shaft 32ª.

In the use of this mirror structure the frame 25 is disposed at a point confronting a television set and may be suspended from a wall or disposed on a table or other support. The mirrors 24 and 25 may each be swung outwardly in opposite directions so that the picture of the television set will be reflected in opposite and angularly disposed directions so that the picture may be viewed from a point remote from the set.

The mirror structure herein disclosed may also be mounted in hallways, rooms or other locations where it is desired to view the hallway or interior of the room from a remote or the desired point.

What is claimed is:

An adjustable mirror comprising a rectangular frame formed of upper and lower channel-shaped bars, and channel shaped vertical end bars having their open sides disposed in inward confronting relation, a pair of T-shaped mirror supporting members, each comprising a horizontal rod and an integral vertical rod, each of said end bars having a pair of vertically spaced slots in the front wall thereof, vertically spaced eyes on each vertical rod, a shank secured to each eye, pairs of ears fixed to the rear wall of each end bar, each pair being aligned with one of said slots, a pivot connecting each shank with a pair of ears for pivotal movement of said vertical rod about a vertical axis, said shanks being adapted to swing outwardly in said slots, a pair of rectangular mirrors, a backing plate secured to each mirror, and a pair of U-shaped clamps secured to each backing plate, each pair engaging about a horizontal rod, pivotally mounting each mirror for movement about a horizontal axis, each mirror being of a size of substantially half that of said frame, said mirrors when folded being adapted to having their inner edges in confronting relation and lying wholly within said frame for free vertical and horizontal pivotal movement thereof and a finger engageable knob adjacent the confronting edge of each mirror.

References Cited in the file of this patent

UNITED STATES PATENTS

| | | |
|---|---|---|
| 387,387 | Wiederer | Aug. 7, 1888 |
| 494,497 | Tarbell | Mar. 28, 1893 |
| 2,566,830 | Goldsmith | Sept. 4, 1951 |

FOREIGN PATENTS

| | | |
|---|---|---|
| 390,230 | France | Apr. 4, 1908 |